(No Model.)
J. HOWARD, E. T. BOUSFIELD & G. GIBBS.
CORD HOLDER OPERATING MECHANISM.
No. 338,228. Patented Mar. 16, 1886.
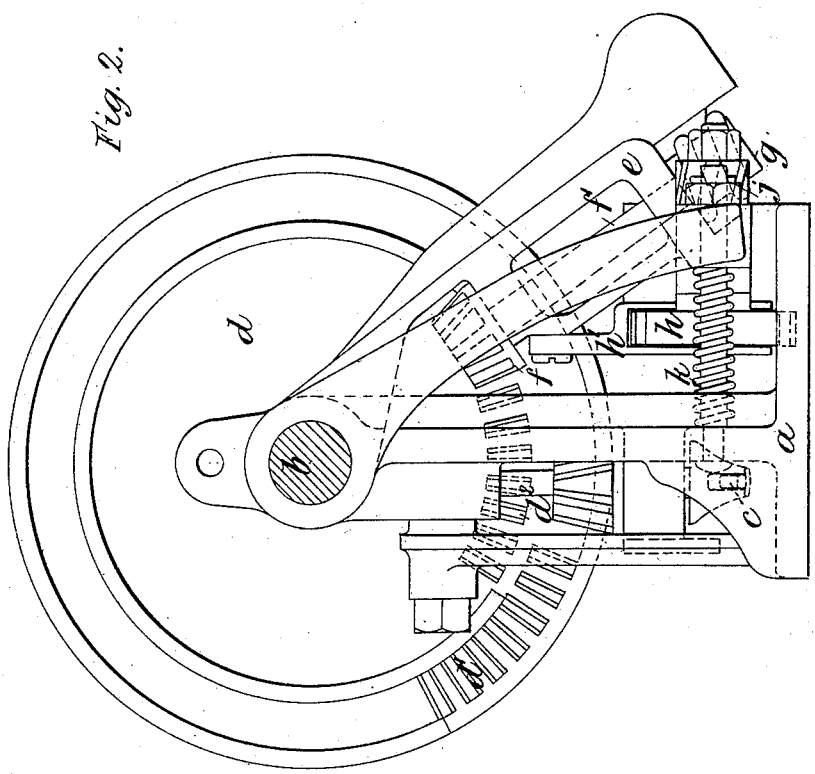
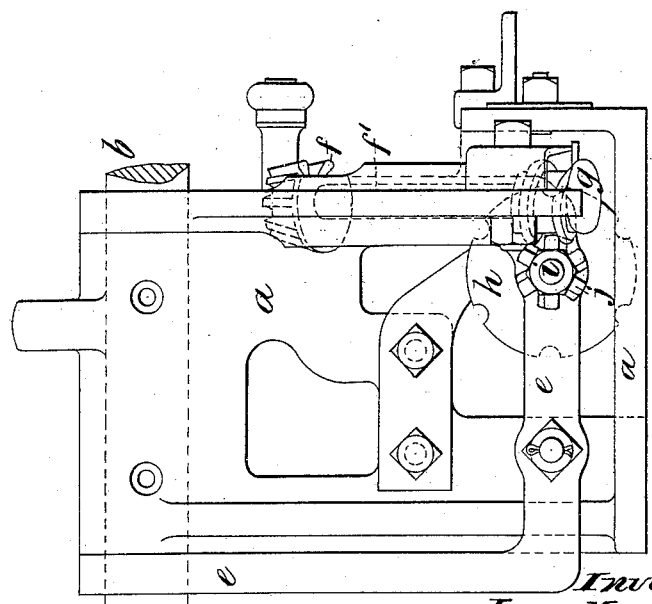
Witnesses.
Percy B. Hill.
Robert Everett
Inventors.
James Howard
Edward T. Bousfield
George Gibbs.
By James L. Norris. Atty.

United States Patent Office.

JAMES HOWARD, EDWARD TENNEY BOUSFIELD, AND GEORGE GIBBS, OF BEDFORD, ENGLAND; SAID BOUSFIELD AND GIBBS ASSIGNORS TO SAID HOWARD.

CORD-HOLDER-OPERATING MECHANISM.

SPECIFICATION forming part of Letters Patent No. 338,228, dated March 16, 1886.

Application filed November 12, 1885. Serial No. 182,588. (No model.) Patented in England August 25, 1885, No. 10,060.

*To all whom it may concern:*

Be it known that we, JAMES HOWARD, EDWARD TENNEY BOUSFIELD, and GEORGE GIBBS, engineers, subjects of the Queen of Great Britain, and all residents of Bedford, England, have invented new and useful Improvements in Cord-Holder-Operating Mechanism for Grain-Binders, (for which we have obtained provisional protection in Great Britain, No. 10,060, bearing date August 25, 1885,) of which the following is a specification, reference being had to the accompanying drawings.

Our invention is designed to improve sheaf-binding harvesters and trussing-machines in respect of tying or knotting mechanism—such as that referred to in the specification of Letters Patent of the United States granted to J. F. Appleby, September 17, A. D. 1878, No, 208,137, and also in the specification of British Letters Patent granted to one of us and dated October 22, 1883, No. 5,023. The said mechanism comprises a cord-holder disk, and one object of the improvements forming the subject of the said British patent was the operation of this holder-disk by rotary mechanism, instead of by the to-and-fro or reciprocating devices which had been previously used for this purpose.

By our present improvements we combine the advantages obtained by the rotary mechanism described in the specification of the aforesaid patent, with the advantage of a yielding or elastic support of the said holder-disk and its adjuncts.

In carrying our invention into practice we mount the knotting-hook and the tucker with its cutter on one frame, which we term the "fixed" frame, and the holder-disk with its worm-wheel and pinion upon another frame, which we term the "swinging" frame. The fixed frame, which carries the knotter-hook and its adjuncts, is rigidly attached to the breast-plate of the binding-table, and the knotter-shaft passes through and has a bearing in this fixed frame. The said knotter-shaft also carries the cam or wheel on which are formed teeth, which gear with and drive the worm-shaft pinion for operating the holder-disk. The swinging frame, which carries the holder-disk, is pivoted or hung on the knotter-operating shaft or spindle, so that the said holder-disk, within a certain range, is free to move to and from the knotting-hook in the arc of a circle concentric with the knotter-shaft, so that in thus moving the worm-shaft pinion remains in gear with the teeth on the side of the aforesaid cam-wheel. The object of permitting the holder-disk thus to move is to prevent undue tension upon the string just at the moment when the knot is being formed, the tension upon the string being sufficient to draw the frame, with its holder-disk, toward the knotting-hook. At all other times the holder-disk is kept at the requisite distance from the knotting-hook by a spring between the two frames.

In the accompanying drawings we have shown the parts of the mechanism to which our improvements particularly relate.

Figure 1 is a front elevation, and Fig. 2 a side elevation, of the same.

Like letters indicate the same parts in both figures.

$a$ is the fixed frame.

$b$ is the knotter-actuating shaft or spindle, and $c$ is a knotting-hook.

$d$ is the cam-wheel, fixed on the knotter-actuating shaft, and having on it the teeth $d'$, for driving the said hook, and the teeth $d^2$, for actuating the cord-holder disk.

$e$ is the swinging or pivoted frame, and $f$ is a pinion which gears with the teeth $d^2$, and is fixed on the upper end of the worm shaft or spindle $f'$. This shaft or spindle is carried in the swinging frame $e$, and has the worm $g$ fixed on its lower end.

$h$ is the holder disk or wheel, and $h'$ is the shoe which acts in conjunction with the said disk, and is kept in the proper position relatively to the same by a spring. (Not shown.) The said holder disk or wheel is mounted on the short shaft $i$, which is carried in the said swinging frame.

$j$ is a worm-wheel, which gears with the worm $g$, and is thereby operated to impart the required movements to the said holder-disk, and $k$ is a spring, which offers an elastic resistance to the swinging frame when it is pulled inward or toward the fixed frame by the string. This spring has the advantage that it enables the cam and roller, heretofore usually employed for keeping the fixed and swinging frames apart, to be dispensed with, and it only gives string to feed the knotter when the latter requires it, which is not the case with the cam and roller, which give slack string whether it is required or not.

The cam $d$ has a rotary motion imparted to it by well-known means, which need not now be described, and in its rotation the teeth $d^2$ pass into and out of gear with the pinion $f$, thereby so operating the worm $g$ as to cause it to impart to the holder-disk the required intermittent movements. The action of this disk in gripping or holding the string while the knot is being tied by the hook is the same as heretofore; but instead of maintaining a rigid tension upon the string, as when carried in a fixed support, it adapts itself automatically to the varying positions of the hook in tying the knot, and thus prevents an undue or excessive stress or tension thereon at any part of the operation.

As the aforesaid swinging frame is hung or pivoted upon the axis of the series of teeth $d^2$ with which the worm shaft pinion is geared, it is obvious that in all the positions of the said swinging frame the said pinion will remain concentric with the teeth $d^2$, so that the action of the holder-operating mechanism is not interfered with, and this contrivance enables us to accomplish in a very convenient and satisfactory manner the chief object of our invention, as above stated—viz., the combination of driving mechanism, all the movements of which are rotary, with a swinging or pivoted and elastic or yielding support and action of the cord-holder devices.

What we claim is—

1. The combination, with the knotter-hook, of the cord-holder driven by toothed gearing and mounted on a swinging frame pivoted on the axis of the holder-operating wheel, substantially as described.

2. The combination, with the knotter-operating wheel provided with the series of teeth concentric with the knotter-shaft, of the pinion $f$, shaft $f'$, worm $g$, worm-wheel $j$, shaft $i$, and holder-disk $h$, mounted on a swinging frame, substantially as described.

3. The combination, with a knotting-hook mounted on a fixed frame, of a knotter-actuating shaft supported in said frame and provided with a toothed cam-wheel, a swinging frame pivoted on the knotter-actuating shaft, and a cord-holder disk and its rotary actuating mechanism carried by said swinging frame, substantially as described.

4. The combination, with a fixed frame and a knotting-hook and knotter-actuating shaft supported by said frame, of a toothed cam-wheel fixed to the knotter-actuating shaft, a swinging frame pivoted on said shaft, a cord-holder disk mounted on a shaft carried by said swinging frame, mechanism carried by said frame for actuating the cord-holder from the cam-wheel, and a spring for keeping the swinging frame and fixed frame apart, substantially as described.

5. The combination, with a knotter-hook supported by a fixed frame, of a cord-holder mounted on a swinging frame and driven by rotary mechanism, and an elastic support for holding said frames apart, substantially as described.

6. The combination of the fixed frame $a$, the knotting-hook $c$, and knotter-actuating shaft $b$, supported by said frame, the toothed cam-wheel $d$, fixed to the shaft $b$, the swinging frame $e$, pivoted on said shaft, the pinion $f$, worm-shaft $f'$, worm $g$, shaft $i$, cord-holder $h$, and shoe $h'$, carried by the swinging frame, and the spring $k$, for resisting the inward movement of the swinging frame, substantially as described.

In testimony whereof we have hereunto signed our names in the presence of two subscribing witnesses.

JAMES HOWARD.
EDWARD TENNEY BOUSFIELD.
GEORGE GIBBS.

Witnesses:
WM. ROBT. LAKE,
JOHN E. BOUSFIELD.